Aug. 25, 1936. M. BOUCHER Re. 20,076

BROOCH ASSEMBLAGE

Original Filed Oct. 26, 1935

INVENTOR
Marcel Boucher
BY
Henry J. Lucke
HIS ATTORNEY

Reissued Aug. 25, 1936

Re. 20,076

UNITED STATES PATENT OFFICE 20,076

BROOCH ASSEMBLAGE

Marcel Boucher, Eltingville, Staten Island, N. Y.

Original No. 2,034,128, dated March 17, 1936, Serial No. 46,843, October 26, 1935. Application for reissue June 17, 1936, Serial No. 85,748

9 Claims. (Cl. 63—20)

The present invention relates to improved brooch assemblages.

My present invention is an improvement of and supplemental to the generic structural features of my invention set forth in my co-pending application Serial No. 44,371, filed Oct. 10, 1935, entitled Brooch assemblage. My present invention utilizes the brooch base member in combination with a set of clip members, each clip member including a clip base member, the brooch base member and the respective clip base members being associated with one another by resilient means afforded by elements of the brooch base member.

Pursuant to my present invention, resiliency may be had by blanking out median portions of extensions of the brooch base member to afford, upon application of pressure, relative displacement and subsequent tensioning of such parts of the brooch base member, or by the provision of resilient means non-integral with but a part of the brooch base member.

As above indicated, the clip members when assembled upon the brooch base member may be worn as a brooch assemblage, suitable provision being made, as by a safety pin or equivalent, for attaching the assemblage upon the wearer's garment, or one, both or all clip members may be dis-assembled from the brooch base member and worn individually, or as a pair or set.

Each clip member comprises a clip back member upon which the ornamentation, per se, is mounted, and further comprises a clip base member serving the dual functions of affording assembly and dis-assembly relative to the brooch base member and in correlation with the clip back member for securing and locking the clip member individually to the material of a garment.

Further features and objects of the invention will be more fully understood from the following detail description and the accompanying drawing, in which Fig. 1 is a plan view of a combination brooch and clip assemblage adapted to be mounted upon a brooch base member and associated parts for the individual clip members, constructed and coordinated pursuant to my present invention.

Figure 1:
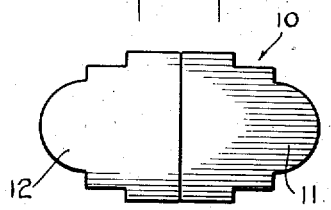
Figure 2:
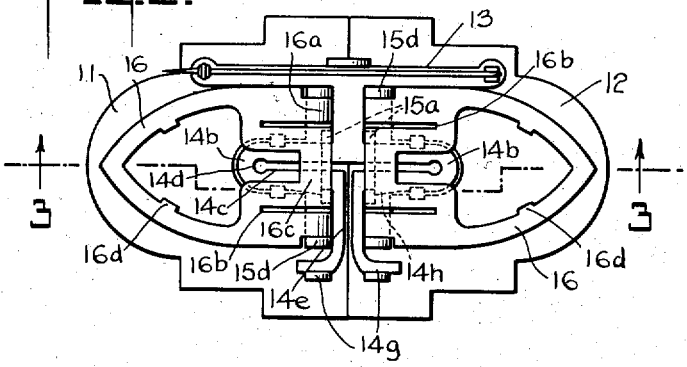
Fig. 2 is a rear elevational view of Fig. 1, on an enlarged scale, illustrating the application of the principles of my present invention to a brooch such as is illustrated in Fig. 1.

Referring to the drawing, Fig. 1 illustrates a two-clip type of brooch 10, the pair of indicated clips 11, 12, being adapted to be mounted upon an assembling brooch base member. The ornamentation of the respective clips is optional, the individual ornamented elements 11, 12, being respectively mounted upon appropriate parts, described more fully hereinafter, to afford ready and secured assembly of the respective clip members relative to the brooch base member, and to afford ready dis-assembly of the clip members individually to permit the same to be worn by the user either individually or as a pair or set. The brooch assemblage may be secured to the material of the garment of the wearer in any suitable manner, usually by means of a safety pin of the character shown at 13, hinged at **13*a* to a part of the brooch base member and a suitable safety lock 13*b***.

The brooch base member provides per se for resiliency for effecting the association and the dis-association of the respective clip members relative to the brooch base member. One embodiment of such resilient brooch base member and associated clip parts is depicted in the exploded view of Fig. 4, comprising, in essentials, as indicated generally by the reference number 14, a body portion **14*a*, extension portions 14*b* corresponding in number to the number of the clip members, in this instance two. In the construction shown in Fig. 4, resiliency of the respective extension members 14*b* is had by blanking out median portions of such extension members 14*b* respectively, as by means of the blanked out slot 14*c* terminating at its opposing ends in enlarged openings 14*d* and further blanking a median portion—indicated at 14*e*—of the body of the brooch base member transversely to and merging at its inner terminus with the blanked slot 14*c*, and terminating at its outer end in the arcuate diverging opening 14*f* to provide for the opposingly related, coacting "spring" extensions 14*g*, whereby upon exerting pressure upon such extensions 14*g* toward one another, the resiliently related parts of the extensions 14*b* are moved relatively toward one another, to afford, as appears more fully hereinafter, the assembling and dis-assembling of the clip members relative to the brooch base member. Upon each extension, as at a lateral edge therefor, is formed a cam projection, see 14*h***, serving as a locking element, in cooperation with a co-ordinated part of a clip member, as appears more fully hereinafter.

Figure 4:
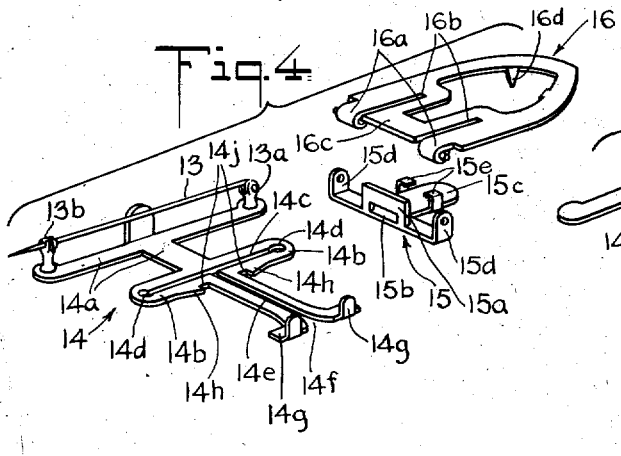
Fig. 4 is an exploded view in perspective, showing one embodiment of my brooch base member, and associated clip base member and clip back member.

The embodiment shown in Fig. 4 comprises further a clip base member 15 embodying, in essentials, an apertured member 15*a*, its aperture being indicated at 15*b*, and extends upwardly, i. e., at right angles, to the body portion 15*c* of the clip base member. The clip base member comprises further ears 15*d*, opposingly related, for hinge or equivalent relationship with its appropriate clip back member 16; in this instance the ears 15*d* are provided with registering openings as indicated, for receiving a pintle or a pair of respectively associated pintle members 16*a* carried by the clip back member. In the illustrated instance, the aperture 15*b* is substantially rectilinear in outline.

Accordingly, upon exerting pressure upon the extension member 14*g* to press the same toward one another, the clip base member 15 is associated with and upon the extension 14*b* by passing the free end of such extension 14*b* through the aperture 15*b* of the clip base member 15 until the apertured member 15*a* has passed beyond the cam projection 14*h* of the extension 14*b* to enter its locking slot 14*j*, whereby upon release of the "spring" extensions 14*g*, the clip is lockedly retained in its assemblage position. Conversely, to dis-assemble the clip base member relative to the brooch base extension 14*b*, the "spring" extensions 14*g* are similarly pressed toward one another, permitting the apertured member 15*a* to be released from locking engagement with the cam projection 14*h*, and permitting the clip member to be displaced from and out of the locking slot 14*j* of the brooch base member.

Figure 3:
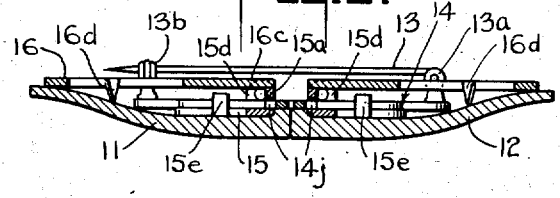
Fig. 3 is a sectional view on line 3—3 of Fig. 2.

Each clip member further comprises resilient means, in this instance afforded by blank-slotting a terminal portion of the body of the clip back member, a manner of slotting being indicated at 16*b*, 16*b*, whereby the resulting tongue 16*c* in cooperation with the body of the apertured member 15*a*, resiliently biases the clip back member 16 and its associated clip base member 15 toward closing position, utilized when each clip member is worn individually or as a pair or set independently of the brooch assemblage. Preferably, as is shown in Fig. 3, locking means is afforded by upsetting as is indicated at 16*d*, to provide an extension for piercing or entering the material of the garment to which the clip is applied.

It is further observed that the blanked slots 16*b*, 16*b*, cooperate further to effect "springing" of the pintle members to afford assembly and dis-assembly relative to the hinge opening members 15*d*, 15*d*, of the clip base member 15.

Figure 5:
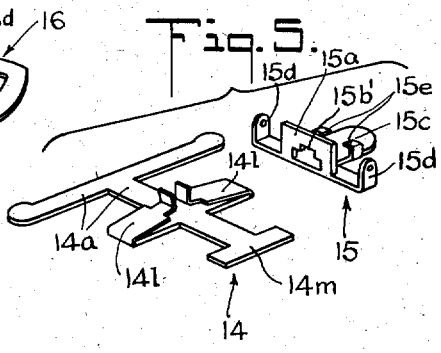
Fig. 5 is an exploded view of another embodiment of my brooch base member and associated clip base member.

The embodiment illustrated in Fig. 5 follows generally the principle of that of Fig. 4, and like parts are designated by like reference characters. The embodiment shown in Fig. 5 in particular affords "spring" cooperation with appropriate clip base members—and correspondingly with an appropriate clip back member, similar to the clip back member 16; associated with the illustrated clip base member, by flat "spring" elements 14*l*, 14*l*, secured to the body 14*a* of the clip base member, the aperture 15*b*′ being suitably apertured in conformity to the dimensional contour of such "spring" elements 14*l*. The extension 14*m* of the brooch base member functions to engage in immediate face to face contact the body of the clip base member 15 when the same has been assembled upon the brooch base member 14.

The inturned ears 15*e*, 15*e*, of the clip base member 15 serve as aligning and retaining, i. e., prong elements relative to the respective extensions 14*b* or 14*l*.

As appears from the above, and as shown in the drawing, the terminal portions 14*e*, 14*e*, per se, and jointly with their extensions 14*g*, 14*g*, serve respectively, in conjunction with the body portion 14*a*, of the brooch base member to support the respective clip members in stable position.

The clip members may be individually dis-assembled, and conversely assembled relative to the brooch base member by applying pressure upon and directed between its "spring" member and any fixed part of the brooch base member.

Whereas I have described my invention by reference to specific forms thereof, it will be understood that many changes and modifications may be made without departing from the spirit of the invention.

I claim:

1. The combination of a plurality of clip members, a brooch base member for commonly mounting said clip members, said brooch base member comprising a body portion, said brooch base member further including extensions secured to said body portion, each extension carrying a resilient formation, each clip member including an apertured element adapted to receive and cooperate with one of the extensions of said brooch base member, said apertured element of a clip member cooperating with said resilient formation of such one extension for retaining and locking the clip member upon such one extension.

2. The combination of a plurality of clip members, a brooch base member for commonly mounting said clip members, said brooch base member comprising a body portion, said brooch base member further including extensions integrally secured to said body portion, the material of each extension having a resilient formation, each clip member including an apertured element adapted to receive and cooperate with one of the extensions of said brooch base member, said apertured element of a clip member cooperating with said resilient formation of such one extension for retaining and locking the clip member upon such one extension.

3. The combination of a plurality of clip members, a brooch base member for commonly mounting said clip members, said brooch base member comprising a body portion, said brooch base member further including extensions slotted to afford resiliency, each extension having a cam formation, each clip member including an apertured element adapted to receive and cooperate with the cam formation of one of the extensions of said brooch base member to retain and lock said clip member thereon.

4. The combination of a plurality of clip members, a brooch base member for commonly mounting said clip members, said brooch base member comprising a body portion, said brooch base member further including resilient extensions secured to said body portion, each extension having a cam formation, each clip member including a member having a rectangularly outlined aperture adapted to receive and cooperate with the cam formation of one of the extensions of said brooch base member to retain and lock said clip member thereon.

5. The combination of a plurality of clip members, a brooch base member for commonly counting said clip members, said brooch base member comprising a body portion, said brooch base member further including resilient extensions secured to said body portion, each extension having a cam formation, each clip member including an apertured element adapted to receive and cooperate with the cam formation of one of the extensions of said brooch base member to retain and lock said clip member thereon, each clip member further including a clip back member, the body of which is slotted to provide in cooperation with said apertured element resiliency toward closing, said clip back member including oppositely disposed pintle elements resiliently related to one another and for affording hinge relationship with its associated clip base member.

6. In combination a pair of clips, each of said clips having an ornamental jaw and a back jaw hinged thereto, a plate, and means independent of said back jaw for securing said clips to said plate, the said plate being slotted to afford resiliency for retaining and locking said means thereon.

7. In combination, a pair of clips each having an ornamental front jaw, and a back jaw hinged thereto, a plate slotted to afford resiliency and provided with a locking member, and means independent of the back jaw, cooperating with the locking member on the slotted plate, to lock the plate in engagement with the front jaw.

8. In combination, a clip, said clip having an ornamental front jaw and a back jaw hinged thereto, a base, a portion of said base being slotted to afford resiliency and means independent of said back jaw and cooperating with said slotted portion of said plate for lockingly retaining said ornamental front jaw in engagement with said plate.

9. In combination, a pair of clips each clip having an ornamental front jaw and back jaw hinged thereto, a base, said base having symmetrically related portions slotted to afford resiliency, and means independent of the back jaw of each of said clips and cooperating with any of said symmetrically related slotted portions for lockingly retaining the ornamental front jaw of such clip in engagement with said plate.

MARCEL BOUCHER.